(12) United States Patent
Zafian

(10) Patent No.: US 11,292,857 B2
(45) Date of Patent: Apr. 5, 2022

(54) METHODS AND SYSTEMS FOR THE PRODUCTION OF HIGH MOLECULAR WEIGHT ETHYLENE-BASED POLYMERS

(71) Applicant: ExxonMobil Chemical Patents Inc., Baytown, TX (US)

(72) Inventor: William J. Zafian, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/011,677

(22) Filed: Sep. 3, 2020

(65) Prior Publication Data

US 2021/0130514 A1 May 6, 2021

Related U.S. Application Data

(60) Provisional application No. 62/928,636, filed on Oct. 31, 2019.

(51) Int. Cl.
| | | |
|---|---|---|
| *C08F 210/02* | (2006.01) | |
| *C08F 2/00* | (2006.01) | |
| *C08F 2/01* | (2006.01) | |
| *C08F 218/08* | (2006.01) | |

(52) U.S. Cl.
CPC .......... *C08F 210/02* (2013.01); *C08F 2/001* (2013.01); *C08F 2/01* (2013.01); *C08F 218/08* (2013.01)

(58) Field of Classification Search
CPC .......... C08F 210/02; C08F 2/001; C08F 2/01; C08F 18/08
USPC .......................................................... 526/66
See application file for complete search history.

(56) References Cited

U.S. PATENT DOCUMENTS

| | | | |
|---|---|---|---|
| 4,229,416 A | 10/1980 | Donaldson et al. | |
| 5,227,445 A | 7/1993 | Berger et al. | |
| 6,300,430 B1 | 10/2001 | Deckers et al. | |
| 6,610,797 B1 | 8/2003 | Deckers et al. | |
| 6,762,254 B1 | 7/2004 | Deckers et al. | |
| 7,285,583 B2 | 10/2007 | Stumphauzer et al. | |
| 7,501,468 B2 | 3/2009 | Stumphauzer et al. | |
| 7,772,313 B2 | 8/2010 | Stumphauzer et al. | |
| 8,119,752 B2 | 2/2012 | Mahling et al. | |
| 10,005,862 B2 | 6/2018 | Finette et al. | |
| 2004/0029980 A1 | 2/2004 | Stumphauzer et al. | |
| 2004/0265361 A1 | 12/2004 | Kuniya et al. | |
| 2008/0156438 A1 | 7/2008 | Stumphauzer et al. | |
| 2008/0161496 A1 | 7/2008 | Stumphauzer et al. | |
| 2009/0133826 A1 | 5/2009 | Stumphauzer et al. | |
| 2011/0136967 A1 | 6/2011 | Mahling et al. | |
| 2015/0011717 A1* | 1/2015 | Garland, Jr. ............ | C08F 10/02 526/64 |
| 2019/0194361 A1 | 6/2019 | Berbee et al. | |

FOREIGN PATENT DOCUMENTS

| | | |
|---|---|---|
| KR | 101757574 | 7/2017 |
| WO | WO 2014-0181991 | 11/2014 |

OTHER PUBLICATIONS

Henderson, A., (1993) "Ethylene-vinyl acetate (EVA) copolymers: a general review," *IEEE Electrical Insulation Magazine*, pp. 30-38.
Aumnate, C. et al., "Effect of ethylene vinyl acetate on the rheological and mechanical behavior of low-density polyethylene-based greenhouse film," Advanced Material Research (2010), vols. 93-94, pp. 475-478.

* cited by examiner

*Primary Examiner* — Hui H Chin
(74) *Attorney, Agent, or Firm* — ExxonMobil Chemical Patents Inc.—Law Department

(57) ABSTRACT

Processes and systems for preparing copolymers of ethylene and a polar comonomer include contacting an initial feed comprising ethylene and a polar comonomer with a first polymerization initiator in a continuous stirred tank reactor to form a first polymer, which may then be contacted with second polymerization initiator in a plug flow reactor to form a second polymer. The process yields a second polymer having a lower melt flow index (and higher molecular weight) with high polar comonomer content. The polar comonomer may be, for example, vinyl acetate to prepare a poly(ethylene-vinyl acetate) copolymer having a vinyl acetate content of up to about 33% while maintaining the melt flow rate less than about 10 g/10 minutes without the use of fillers.

14 Claims, 2 Drawing Sheets

METHODS AND SYSTEMS FOR THE PRODUCTION OF HIGH MOLECULAR WEIGHT ETHYLENE-BASED POLYMERS

CROSS-REFERENCE TO RELATED APPLICATION

This application claims the benefit of U.S. Provisional Application 62/928,636 filed Oct. 31, 2019 entitled "Methods and Systems for the Production of High Molecular Weight Ethylene-Based Polymers", the entirety of which is incorporated by reference herein FIELD The present disclosure relates to processes and systems for preparing copolymers of ethylene and a polar comonomer.

BACKGROUND

Disclosed herein are methods and systems for generating ethylene-based polymers having a high molecular weight (as evidenced by a low melt flow index, "MFI", equivalently melt index or "MI") and a high comonomer content with an enhanced conversion efficiency?

Ethylene-based polymers (e.g., poly(ethylene-vinyl acetate) (PEVA), which is a copolymer of ethylene and vinyl acetate (VA)), have a variety of applications, for example, pour depressants and flow improvers for distillate oil. PEVA is an elastomeric polymer having rubber-like softness and flexibility, good clarity, gloss, low-temperature toughness, stress-crack resistance, waterproof properties when used as hot-melt adhesive, and resistance to UV radiation.

These properties may be shaped to some degree by the molecular weight of the polymer. A high molecular weight increases how far a material can stretch before rupturing. A higher molecular weight increases the impact resistance of a material. A higher molecular weight increases the chemical resistance. The greater the percent of the material characterized by a high molecular weight (i.e., narrow molecular weight distribution), likewise, will enhance the high performing properties. The properties may also be influenced by branching in the polymer. More branching, especially long-chain branching, will improve the polymer strength and toughness. In short, enhanced performance is achieved by forming polymers having higher molecular weight, a narrow molecular weight distribution, and/or a high degree of branching.

In contrast, the presence of a comonomer (e.g., VA), which imparts certain desirable properties, also tends to typically reduces molecular weight, at least in part due to its tendency to terminate the polymerization reaction. Thus, producing a PEVA polymer that has both a high molecular weight as well as high VA content is difficult. For example, FIG. 2 of the journal article Henderson, A., (1993) "Ethylene-vinyl acetate (EVA) copolymers: a general review," *IEEE Electrical Insulation Magazine*, pages 30-38, which is incorporated herein by reference, is a graph depicting a limitation between molecular weight and VA content in a PEVA polymer. The area above the depicted curve is labeled as "not possible." Methods for forming a PEVA copolymer characterized by both a high molecular weight as well as a high VA content would be highly advantageous to the industry.

Another issue facing the industry is conversion efficiency. The simplest, cheapest, and most easily operated method of producing PEVA is in a continuous stirred tank reactor (CSTR, also known as an autoclave reactor). However, CSTRs typically exhibit poor conversion efficiency, typically about 15%. Additionally, the molecular weight distribution of polymers formed in a CSTR is often quite wide, as residence time varies from molecule to molecule. Methods exploiting the simplicity and cost-effectiveness of a CSTR, but improving conversion efficiency and the properties of polymers generated therein, would be highly advantageous to the industry.

SUMMARY OF THE INVENTION

Disclosed herein are methods and systems for generating ethylene-based polymers having both a high molecular weight (as evidenced by a lower MFI) and a high comonomer content with an enhanced conversion efficiency. Suitable methods for generating ethylene-based polymers having both a high molecular weight (as evidenced by a lower MF) and a high comonomer content with an enhanced conversion efficiency comprise contacting an initial feed comprising ethylene and a polar comonomer with a first polymerization initiator in a continuous stirred tank reactor to form an intermediate stream comprising a first polymer having a first polymer melt flow index (MFI). The process further comprises contacting the intermediate stream with a second polymerization initiator in a plug flow reactor to form a product stream comprising a second polymer having a second polymer MFI that is lower than the first polymer MFI. A suitable polar comonomer may comprise one or more of the following: a vinyl ester, a vinyl silane, a vinyl phosphine, a vinyl sulfide, an acrylic ester, an acrylic acid derivative, a nitrile, an acrylamide, maleic anhydride, N-vinylcarbazole, bis-(2-chloroethyl) vinylphosphonate, allyl alcohol, and N-vinyl-N-methylacetamide.

Additionally, provided herein are polymers produced by methods comprising contacting the intermediate stream with a second polymerization initiator in a plug flow reactor to form a product stream comprising a second polymer having a second polymer MFI that is lower than the first polymer MFI. Similarly, the second polymer may have a higher molecular weight than the first polymer. For example, using the methods disclosed herein, a second polymer may be formed having a polar comonomer content from about 25 wt. % to about 33 wt. % and an MFI less than about 10 g/10 minutes. In particular, a second polymer may be formed having a polar comonomer content from about 25 wt. % to about 30 wt. % and an MFI less than about 5 g/10 minutes.

Generally, polymers may be produced by the methods disclosed herein that satisfies the following equation:

$$\text{melt flow index} \leq 0.0036 \pm 0.00002 e^{0.2407 \times [polar\ comono\ mer]}.$$

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
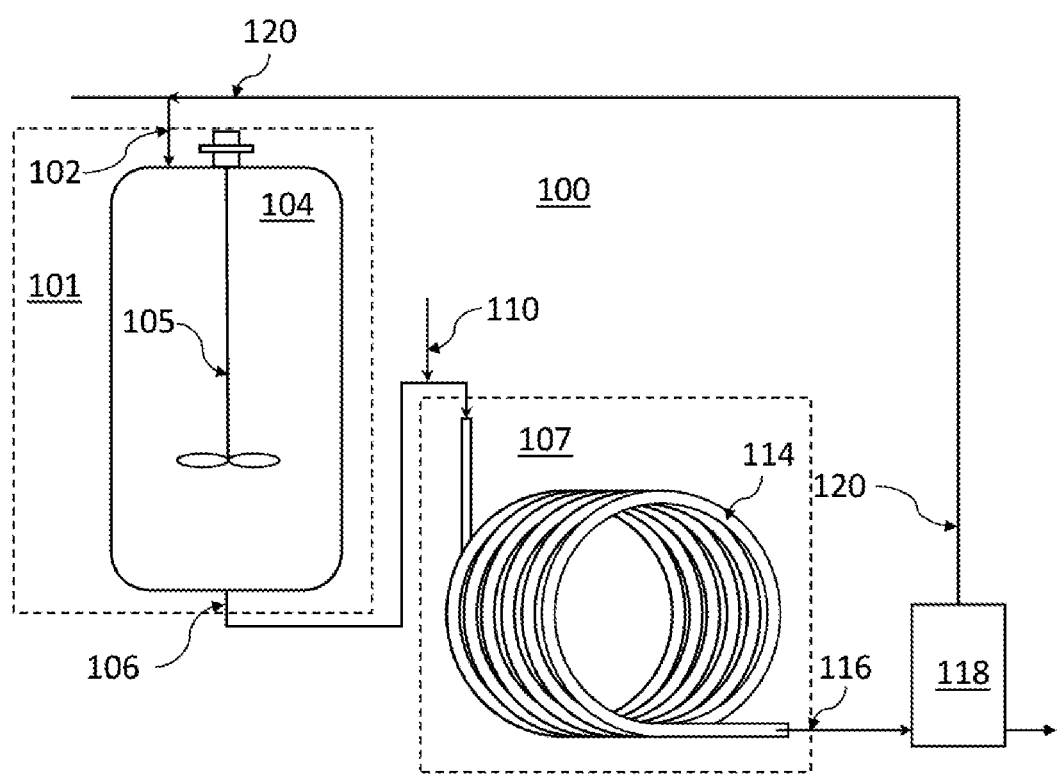
FIG. 1 illustrates the relationship between MFI (which is inversely related to molecular weight) and the vinyl acetate comonomer content in the polymers described herein, which are achievable using the methods herein, as will be discussed in Example 1.

Disclosed herein are methods and systems for generating ethylene-based polymers having both a high molecular weight (as evidenced by a low MFI) and a high comonomer content with an enhanced conversion efficiency.

As used herein, "polymer" refers to a molecule having two or more of the same or different mer units, referring to monomer units. The term "monomer" encompasses "comonomer." For purposes of this disclosure, when a polymer is referred to as comprising a monomer or comonomer, the monomer or comonomer present in such polymer is the polymerized form of the monomer or comonomer. For example, when a polymer is said to have an "ethylene" content of 45 wt. % to 80 wt. %, it is to be understood that the mer unit in the polymer is derived from the monomer ethylene in the polymerization reaction and said derived units are present at about 45 wt. % to about 80 wt. %, based upon the weight of the polymer. Alternatively and equivalently, the polymer may be referred to as having monomer-"derived" content, such as ethylene-derived content, or units derived from ethylene; again, this refers to the mer unit as present in its polymerized form. As used herein, "polymerize" (and grammatical variations thereof, e.g., polymerization) are used interchangeably to refer to a process of generating a molecule having two or more of the same or different mer units from two or more of the same or different monomers. A "homopolymer" is a polymer having mer units that are the same. A copolymer is a polymer having two or more mer units that are different from each other. "Different, " as used to refer to mer units, indicates that the mer units differ from each other by at least one atom or are different isomerically. Accordingly, the definition of copolymer, as used herein, includes terpolymers and the like. Likewise, unless otherwise specified, the term "polymer" and grammatical variations thereof encompasses the term "copolymer" and grammatical variations thereof.

As used herein, feed conversion refers to the incorporation of the monomers present in the initial feed in the final polymer product. Conversion may be quantitatively measured according to Equation (1) below:

$$\text{Percent Feed Conversion} = \frac{\text{mass of feed} - \text{mass of copolymer resin product}}{\text{mass of feed}} \quad (1)$$

Methods and systems for generating ethylene-based polymers are provided herein. The methods include processes that achieve a higher conversion efficiency than known methods and result in high-performance polymers having a high molecular weight (as evidenced by a lower MF) and a high comonomer content, particularly with respect to the molecular weight/MFI achieved in prior art polymers with comparable comonomer content. Equally, the methods include processes that incorporate a higher percentage of comonomer into a polymer while achieving a low MFI (high molecular weight) and doing so at a higher conversion efficiency than known methods.

MFI is utilized herein as an indirect measure of weight average molecular weight ($M_w$). MFI may be measured by standard methods such as ASTM D1238-13 and ISO 1133-1:2011. Generally, an increase in $M_w$ of a polymer correlates with a decrease in MFI, though the degree of change may depend on a variety of factors, such as the branching of the polymer (increased branching further reduces MFI). A decreased MFI in the systems and methods disclosed herein is interpreted as an increase in $M_w$ (and vice versa). Unless otherwise specified, all references to "molecular weight" (and grammatical variations thereof) are meant to mean weight average molecular weight $M_w$. $M_w$ may be measured by any commonly known methods, for example, ASTM D7474-12.

Suitable systems for generating high-performance polymers having a high molecular weight (as evidenced by a lower MF) and a high comonomer content include a first reaction stage comprising a continuous stirred tank reactor (CSTR); an inlet arranged and configured to convey an initial feed to the first reaction stage; a second reaction stage comprising a plug flow reactor (PFR); an intermediate conduit, arranged and configured to convey an intermediate stream comprising a first polymer from the first reaction stage to the second reaction stage; and an outlet, arranged and configured to convey a product stream comprising a second polymer out of the second reaction stage.

Figure 2:
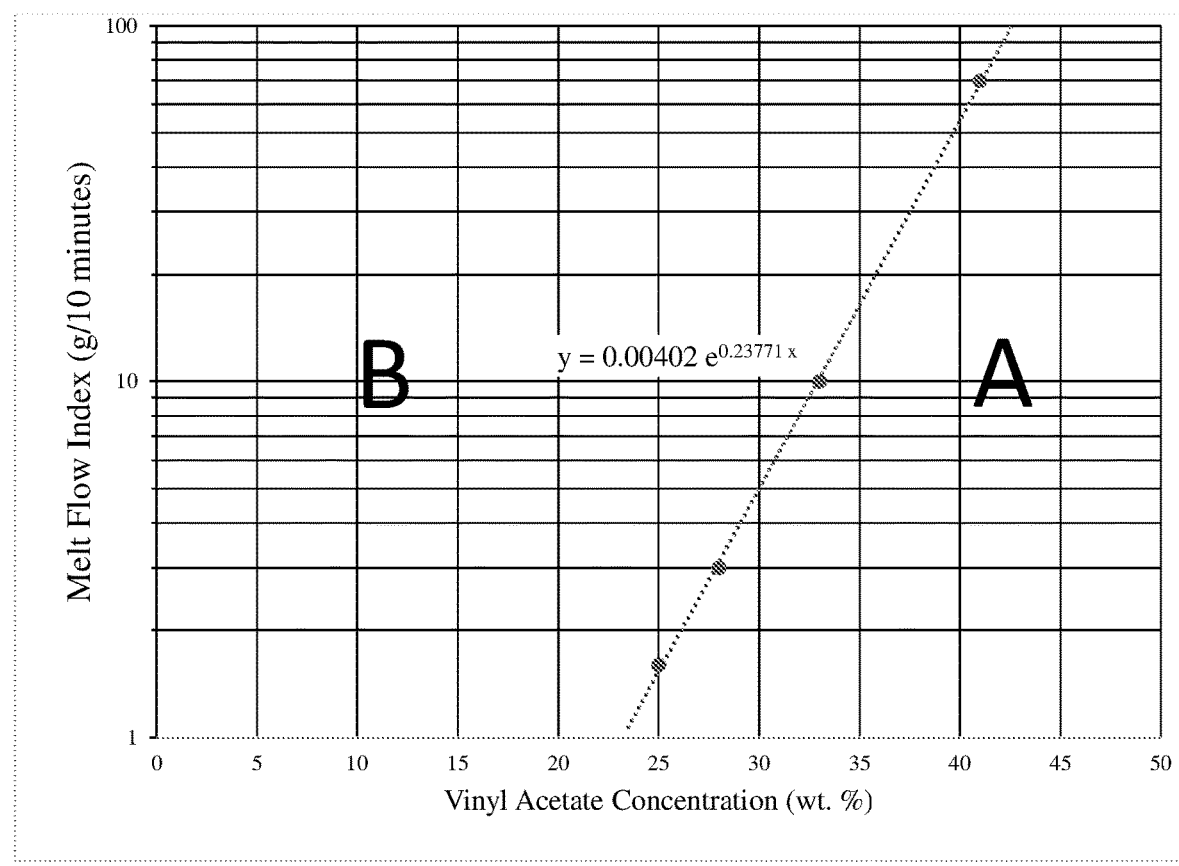
FIG. 2 illustrates an Example of a system suitable for carrying out the methods disclosed herein, the system including a PFR downstream of a CSTR.

An example system 100 is show in FIG. 2. The first reaction stage 101 of a system suitable for generating a polymer as described herein includes a CSTR 104 having a stirring mechanism 105. Initial feed comprising ethylene, a polar comonomer, and a first polymerization initiator may be conveyed through a CSTR feed inlet 102 into the CSTR 104 where a polymerization reaction takes place to form a first polymer.

A CSTR suitable for use in the methods and systems disclosed herein may be operated at pressures and temperatures commonly used in the industry, for example, at pressures from about 180 MPa to about 400 MPa (or from about 180 MPa to about 300 MPa or from about 250 MPa to about 400 MPa) and temperatures of from about 130° C. to about 240° C. (or from about 130° C. to about 200° C. or from about 200° C. to about 240° C.). One skilled in the art will be familiar with temperatures and pressures compatible with any given polar comonomer that may be included in the initial feed. In any embodiment, a CSTR suitable for use in the methods disclosed herein may be a single reactor or multiple reactors in series. In any embodiment, a CSTR suitable for use in the methods disclosed herein may be a baffled or unbaffled reactor. A CSTR includes a stirring mechanism or impeller, which may be of any type, including, but not limited to, anchor, propeller, 6-flat-blade disc turbine, paddle, gate anchor, helical screw, and the like. The impeller may generate axial or radial flow within the CSTR.

The first polymer may then be conveyed out of the CSTR 104 via an intermediate conduit 106, equipped with a second polymerization initiator inlet 110. The intermediate stream may be conveyed through the intermediate conduit 106 into the second reaction stage 107 comprising a PFR 114 wherein a polymerization reaction takes place to form a second polymer.

A PFR suitable for use in the methods and systems disclosed herein may be operated at pressures, temperatures, and flow rates commonly used in the industry, for example, at pressures from about 180 MPa to about 320 MPa (or from about 180 MPa to about 250 MPa or from about 225 MPa to about 320 MPa), temperatures of from about 130° C. to about 325° C. (or from about 130° C. to about 250° C. or from about 200° C. to about 325° C.), and flow rates from about 20 tons/hour to about 180 tons/hour (or from about 20 tons/hour to about 125 tons/hour or from about 100 tons/ hour to about 180 tons/hour). The PFR may be equipped with thermal control apparatus. The PFR may comprise one or more individual zones (e.g., one or more reaction zones and/or one or more cooling zones), each which may be configured to allow different operating conditions therein and each which may be of a different size (e.g., diameter, length).

The second polymer may be conveyed out of the PFR 114 in a product stream through a product outlet 116. The product stream may be conveyed to a separation stage 118 where the second polymer may be separated from unreacted monomer components. The unreacted monomer may be conveyed through a monomer recycle conduit 120 back to any location upstream, for example, to join the initial feed at the CSTR feed inlet 102. The second polymer may be transferred to downstream processes to prepare it for manufacturing applications, such as, but not limited to, extruding the second polymer into pellets.

Systems suitable for the methods disclosed herein may further optionally include a separation stage downstream of the second reaction stage, configured to separate solid polymer (e.g., granules) from gaseous and/or liquid monomer and hydrogen. Systems may further optionally include a hydrogen recycle conduit the convey hydrogen separated from polymer product and gaseous and/or liquid monomer back to the first reaction stage. Systems may further optionally include a comonomer recycle conduit to convey unreacted polar comonomer separated from polymer product back to the first reaction stage. Any conduit, inlet, and outlet may optionally be equipped with one or more flow control devices, such as valves.

Methods disclosed herein may be carried out on the system described above. Methods include contacting an initial feed comprising ethylene and a polar comonomer with a first polymerization initiator in a first reaction stage, the first reaction stage comprising a continuous stirred tank reactor (CSTR), to form a first polymer having a first MFI; and contacting the first polymer with a second polymerization initiator and optionally a supplementary feed comprising the polar comonomer in a second reaction stage, the second reaction stage comprising a plug flow reactor (PFR), under conditions effective to form a product stream comprising a second polymer having a second MFI. The second polymer is cumulatively the polymer produced in the CSTR and PFR.

Methods may include introducing an initial feed comprising ethylene and a polar comonomer (e.g., vinyl acetate), together with a first polymerization initiator into a CSTR reactor operated under conditions effective to form an intermediate stream containing a first polymer having a first MFI.

Suitable initial feeds may comprise ethylene, a polar comonomer, and a first polymerization initiator. The initial feed may additionally include one or more of a solvent, such as a paraffin (e.g., propane, butane, hexene, isododecane, and the like) to carry the first polymerization initiator, optionally an anti-oxidant (e.g., butylated hydroxytoluene, octadecyl-3-(3,5-di-tert.butyl-4-hydroxyphenyl)-propionate, or the like), and optionally, impurities (e.g., ethane, methane, propane) accompanying the ethylene and/or polar comonomer. The polar comonomer may be, but is not limited to, one or more of the following: a vinyl ester, a vinyl silane, a vinyl phosphine, a vinyl sulfide, an acrylic ester, an acrylic acid derivative, a nitrile, an acrylamide, N-ethylmaleimide, maleic anhydride, N-vinylcarbazole, bis-(2-chloroethyl) vinylphosphonate, allyl alcohol, and N-vinyl-N-methylacetamide.

Examples of suitable vinyl esters include, but are not limited to, one or more of vinyl acetate, vinyl butyrate, vinyl pivalate, vinylene carbonate, and any combination thereof. Examples of suitable acrylic esters include, but are not limited to, methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxyphenyl methacrylate, N,N-dimethylaminoethyl methacrylate, t-butylaminoethyl methacrylate, 2-(1-aziridinyl)ethyl methacrylate, diethyl fumarate, diethyl maleate, methyl crotonate, and any combination thereof.

Examples of suitable acrylic acid derivatives include, but are not limited to, acrylic acid, methacrylic acid, crotonic acid, maleic acid, methyl hydroxy maleate, itaconic acid, and any combination thereof. Examples of suitable nitriles include, but are not limited to, acrylonitrile, fumaronitrile, and combinations thereof. Examples of suitable acrylamides include, but are not limited to, N,N-dimethylacrylamide, N-isopropylacrylamide, N-t-butylacrylamide, N-phenylacrylamide, diacetone acrylamide, methacrylamide, N-phenylmethacrylamide, and any combination thereof. Examples of suitable vinyl silanes include, but are not limited to, vinyltrimethylsilane, vinyltriethoxysilane, and combinations thereof. Examples of suitable vinyl phosphines include, but are not limited to, vinyldibutylphosphine oxide, vinyldiphenylphosphine, and combinations thereof. Vinyl methyl sulfide is one, but not the only, example of a suitable vinyl sulfide. In a preferred embodiment, the polar comonomer is vinyl acetate.

The concentration of polar comonomer in the initial feed may be from about 1 wt. % to about 45 wt. %, from about 12 wt. % to about 40 wt. %, or from about 18 wt. % to about 33 wt. %. For example, in any embodiment, the polar comonomer may be present at about 18 wt. %. Conversely, the concentration of ethylene in the initial feed may comprise from about 55 wt. % to about 99 wt. %, from about 60 wt. % to about 82 wt. %, or from about 65 wt. % to about 82 wt. %.

Examples of suitable first polymerization initiators include (but are not limited to) one or more of the following compounds: t-butyl peroxyneodecanoate, t-amyl peroxyneodecanoate, t-butyl peroxypivalate, t-amyl peroxypivalate, 3,5,5-trimethyl hexanoylperoxide, t-butyl peroxy-2-ethylhexanoate, t-amyl peroxy-2-ethyl hexanoate, di-(2-ethylhexyl)peroxydicarbonate, t-butyl peroxyisobutyrate, t-amyl peroxyisobutyrate, t-butyl peroxyacetate, t-amyl peroxyacetate, t-butyl peroxybenzoate, t-amyl peroxybenzoate, hydrogen peroxide, decanoyl peroxide, diethyl peroxide, benzoyl peroxide, t-butylperoxide, t-amyl peroxide, 1,1,3,3-tetramethylbutyl hydroperoxide, a persulfate, a perborate, a percarbonate, and an azo compound. In a preferred embodiment, the first polymerization initiator and second polymerization initiator includes one or more of t-butyl peroxyneodecanoate, t-butyl peroxypivalate, 3,5,5-trimethylhexanoyl peroxide, t-butyl peroxy-2-ethylhexanoate, and di-(2-ethylhexyl)peroxydicarbonate. The concentration of the first polymerization initiator in the CSTR may be from about 0.0025 wt. % to about 0.03 wt. %, about 0.0225 wt. % to about 0.01 wt. %, or about 0.05 wt. % to about 0.03 wt. %, based on the total reaction mixture in the CSTR.

First polymers prepared by the methods and on the systems disclosed herein may comprise ethylene and polar comonomer. A first polymer may contain up to about 45%, on a weight basis, of a polar comonomer. For example, the first polymer may include from about 1 wt. % to about 45 wt. %, from about 12 wt. % to about 40 wt. %, or from about 18 wt. % to about 33 wt. % of a polar comonomer. The conversion of feed to first polymer may be from about 10% to about 20%, including about 10% to about 15%, about 12% to about 18%, or about 15% to about 20%. The first polymer MFI will depend on the polar comonomer and the specific reaction conditions utilized in the CSTR. For example, when using vinyl acetate as the polar comonomer, the first polymer MFI may be from about 2 g/10 minutes to about 5 g/10 minutes (including from about 2 g/10 minutes to about 4 g/10 minutes or about 2.5 g/10 minutes to about 3 g/10 minutes).

Intermediate streams produced according to the systems and methods disclosed herein may additionally include one or more of unreacted ethylene, unreacted polar comonomer, and unreacted first polymerization initiator. The intermediate stream comprising the first polymer may then be conveyed to a PFR and contacted with a second polymerization initiator and an optional supplementary feed under conditions effective to incorporate additional ethylene and polar comonomer into the first polymer to form a second polymer having a second MFI, which may be conveyed out of the PFR in a product stream.

Suitable second polymerization initiators include (but are not limited to) one or more of the following compounds: t-butyl peroxyneodecanoate, t-amyl peroxyneodecanoate, t-butyl peroxypivalate, t-amyl peroxypivalate, 3,5,5-trimethyl hexanoylperoxide, t-butyl peroxy-2-ethylhexanoate, t-amyl peroxy-2-ethyl hexanoate, di-(2-ethylhexyl)peroxydicarbonate, t-butyl peroxyisobutyrate, t-amyl peroxyisobutyrate, t-butyl peroxyacetate, t-amyl peroxyacetate, t-butyl peroxybenzoate, t-amyl peroxybenzoate, hydrogen peroxide, decanoyl peroxide, diethyl peroxide, benzoyl peroxide, t-butylperoxide, t-amyl peroxide, 1,1,3,3-tetramethylbutyl hydroperoxide, a persulfate, a perborate, a percarbonate, and an azo compound. In a preferred embodiment, the first polymerization initiator and second polymerization initiator includes one or more of t-butyl peroxyneodecanoate, t-butyl peroxypivalate, 3,5,5-trimethylhexanoyl peroxide, t-butyl peroxy-2-ethylhexanoate, and di-(2-ethylhexyl) peroxydicarbonate. The first polymerization initiator and second polymerization initiator may be the same as or different from each other). The concentration of the second polymerization initiator in the PFR may be from about 0.001 wt. % to about 0.0075 wt. %, about 0.001 wt. % to about 0.005 wt. %, or about 0.0025 wt. % to about 0.0075 wt. %, based on the total reaction mixture in the PFR.

Second polymers prepared by the methods and on the systems disclosed herein may contain up to about 45%, on a weight basis, of a polar comonomer. For example, the second polymer may include from about 1 wt. % to about 45 wt. %, from about 12 wt. % to about 40 wt. %, or from about 18 wt. % to about 33 wt. % of a polar comonomer. In any embodiment, the second polymer may contain about 18 wt. % polar comonomer, for example, 18 wt. % vinyl acetate. Conversely, the ethylene content in the second polymer may represent the majority of the balance of the composition. For example, the second polymer may include from about 55 wt. % to about 99 wt. %, from about 60 wt. % to about 88 wt. %, or from about 65 wt. % to about 82 wt. % of ethylene. For example, the second polymer may be about 82 wt. % ethylene and about 18 wt. % of vinyl acetate. The ratio of polar comonomer to ethylene in the first polymer may be about the same or may be different when compared to the ratio of polar comonomer to ethylene in the second polymer.

Optionally, an intermediate stream comprising a first polymer may be cooled before being conveyed to the second reaction stage. For example, the intermediate stream may be cooled to about 130° C. to about 200° C. Optionally, the product stream may be further conveyed to a separation stage wherein the second polymer is isolated from unreacted monomer. Optionally, the gaseous monomer and/or liquid monomer may be conveyed through a monomer recycle conduit to a location upstream of the separation stage.

Advantageously, by using the methods described herein, an enhanced conversion of initial feed to the second polymer in the product may be achieved than previously achievable in a CSTR. For example, a batch reaction production of PEVA having a VA content of about 28 wt. % may require an inlet-outlet temperature difference of about 10.5° C. per 1% of desired conversion. Due to temperature constraints, this may limit total conversion to about 15%. In contrast, due to the loosened temperature restrictions of the PFR (e.g., inlet-outlet difference requirement of about 8.5° C. per 1% of desired conversion), the methods and systems disclosed herein may be used to achieve additional conversion, for example, up to about 2% additional conversion, up to about 3% additional conversion, up to about 10% additional conversion or greater. The total conversion of initial feed to the second polymer may be from about 15% to about 25%, from about 15% to about 20%, or from about 15% to about 18%. In turn, a higher conversion of initial feed may improve the efficiency of downstream processes, such as a separation stage.

Further, contrary to expectation, rather than decreasing the molecular weight (increasing the MFI) of the second polymer with respect to the first polymer, employing the methods disclosed herein actually increases the molecular weight (decreases the MFI) of the second polymer as compared to the first polymer. As an example, the second polymer may have an MFI of at least about 10% lower (e.g., about 10% to about 100% lower). In particular, the MFI of the second polymer may be at least about 0.5 g/10 minutes less (or from about 0.5 g/10 minutes to about 2 g/10 minutes less or from about 1 g/10 minutes to about 2 g/minutes less) than the first polymer MFI. Notably, the lower MFI is not achieved in the second polymer through the addition of any viscosity-altering agents, such as fillers (e.g., clay, talc, calcium carbonate, or the like) to the second polymer (thus, the concentration of filler in the second polymer is about zero, or from about 0 wt. % to about 0.1 wt. %).

In a nonlimiting example, a first polymer may have an MFI of about 2.5 g/10 minutes to about 3.0 g/10 minutes. The second polymer may have an MFI of about 2.0 g/10 minutes and a polar comonomer (VA) content of about 28 wt. %. In another example, a second polymer may be produced having a polar comonomer content of about 25 wt. % to about 33 wt. % and an MFI of about 1.5 g/10 minutes to about 10 g/10 minutes. In another example, a second polymer may be produced having a polar comonomer content of about 25 wt. % to about 30 wt. % and an MFI of about 1.5 g/10 minutes to about 5 g/10 minutes. In a particular example, where the polar comonomer is vinyl acetate, a second polymer containing about 28 wt. % vinyl acetate and having an MFI of about 3 g/10 minutes may be formed. In another particular example, where the polar comonomer is vinyl acetate, a second polymer containing about 33 wt. % vinyl acetate and having an MFI of about 10 g/10 minutes may be formed. In yet another particular example, where the polar comonomer is vinyl acetate, a second polymer containing about 25 wt. % vinyl acetate and an MFI of about 1.6 g/10 minutes may be formed. In short, when compared to prior art PEVA polymers, the PEVA polymers produced by the methods disclosed herein may have a high VA content with a lower MFI that previously achievable.

In another example, the relationship of VA comonomer and resulting MFI in a second polymer generated by methods disclosed herein may be described by the Equation (2) below:

$$\text{Second MFI} \leq (0.0040 \pm 0.0002)e^{0.2377 \times [polar\ comonomer]} \quad (2)$$

The second MFI has units of g/10 minutes and the concentration of polar comonomer is in weight percent. This relationship is shown graphically in FIG. 2. In particular, polymers having properties corresponding to the area of the graph labeled "A" may be prepared by the methods and systems described herein, where the area of the graph labeled "B" more typically describes polymers prepared by known or prior art methods.

One of skill in the art might expect that introducing a pre-formed polymeric material (i.e., the first polymer) into a PFR reaction zone may shift the molecular weight of the polymer entering the PFR reaction zone to a lower molecular weight in the product due to the formation of new polymer molecules. However, despite these expectations, adding a PFR reaction zone after an initial reaction process (i.e., the CSTR) does not shift the molecular weight lower. Instead, ethylene and/or polar comonomer is added onto the existing (first) polymer and a higher molecular weight is achieved.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Example Embodiments

One nonlimiting example embodiment disclosed herein includes a process comprising contacting an initial feed comprising ethylene and a polar comonomer with a first polymerization initiator in a continuous stirred tank reactor to form an intermediate stream comprising a first polymer having a first polymer melt flow index; and contacting the intermediate stream with a second polymerization initiator in a plug flow reactor to form a product stream comprising a second polymer having a second polymer melt flow index that is lower than the first polymer melt flow index, wherein the polar comonomer comprises one or more of the following: a vinyl ester, a vinyl silane, a vinyl phosphine, a vinyl sulfide, an acrylic ester, an acrylic acid derivative, a nitrile, an acrylamide, maleic anhydride, N-vinylcarbazole, bis-(2-chloroethyl) vinylphosphonate, allyl alcohol, and N-vinyl-N-methylacetamide.

Optionally, the embodiment may include one or more of the following Elements: Element 1: the process wherein the second polymer comprises from about 18 wt. % to about 45 wt. % of the polar comonomer; Element 2: the process wherein the polar comonomer comprises one or more of the following: methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxyphenyl methacrylate, N,N-dimethylaminoethyl methacrylate, t-butylaminoethyl methacrylate, 2-(1-aziridinyl)ethyl methacrylate, diethyl fumarate, diethyl maleate, methyl crotonate, acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, maleic anhydride, allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide; Element 3: the process wherein the polar comonomer is vinyl acetate; Element 4: the process wherein the relationship between the second polymer melt flow index and polar comonomer content of the second polymer satisfies the following equation:

$$\text{Second Polymer MFI} \leq (0.0036 \pm 0.00002)e^{0.2407 \times [polar\ comonomer]}.$$

and wherein the second polymer melt flow index has units of g/10 minutes and the polar comonomer content is in weight percent of the second polymer; Element 5: the process wherein the weight average molecular weight of the second polymer is greater than the weight average molecular weight of the first polymer; Element 7: the process wherein second polymer melt flow index is at least about 10% (e.g., about 10% to about 100%) lower than the first polymer melt flow index; Element 8: the process wherein the second polymer has a polar comonomer content from about 1 wt. % to about 45 wt. %; Element 9: the process wherein the second polymer has a polar comonomer content from about 25 wt. % to about 45 wt. %; Element 10: the process wherein the second polymer has a polar comonomer content from about 25 wt. % to about 30 wt. % and a second polymer melt flow index equal to or less than about 10 g/10 minutes (e.g., from 0.1 g/10 minutes to about 10 g/minutes); Element 11: the process wherein the second polymer has a polar comonomer content from about 25 wt. % to about 30 wt. % and a second polymer melt flow index equal to or less than about 5 g/10 minutes (e.g., from about 0.1 g/10 minutes to about 5 g/10 minutes); Element 12: the process wherein the second polymer has a polar comonomer content from about 25 wt. % to about 28 wt. % and a second polymer melt flow index equal to or less than about 3 g/10 minutes (e.g., from about 0.1 g/10 minutes to about 3 g/10 minutes); Element 13: the process wherein the continuous stirred tank reactor is operated at a temperature of about 130° C. to about 240° C. and a pressure of about 180 MPa to about 320 MPa; Element 14: the process, further comprising extruding the second polymer; Element 15: the process wherein the first and second polymerization initiator independently comprises one or more of t-butyl peroxyneodecanoate, t-amyl peroxyneodecanoate, t-butyl peroxypivalate, t-amyl peroxypivalate, 3,5,5-trimethyl hexanoylperoxide, t-butyl peroxy-2-ethyl-hexanoate, t-amyl peroxy-2-ethyl hexanoate, di-(2-ethylhexyl)peroxydicarbonate, t-butyl peroxyisobutyrate, t-amyl peroxyisobutyrate, t-butyl peroxyacetate, t-amyl peroxyacetate, t-butyl peroxybenzoate, t-amyl peroxybenzoate, hydrogen peroxide, decanoyl peroxide, diethyl peroxide, benzoyl peroxide, t-butylperoxide, t-amyl peroxide, 1,1,3,3-tetramethylbutyl hydroperoxide, a persulfate, a perborate, a percarbonate, and an azo compound; Element 16: the process wherein the first and second polymerization initiator independently comprises one or more of t-butyl peroxyneodecanoate, t-butyl peroxypivalate, 3,5,5-trimethylhexanoyl peroxide, t-butyl peroxy-2-ethylhexanoate, and di-(2-ethylhexyl)peroxydicarbonate; Element 17: the process wherein the conversion of feed to second polymer is at least about 15% (e.g., from about 15% to about 50%) based on the amount of ethylene and polar comonomer in the initial feed; Element 18: the process wherein the conversion of initial feed to second polymer is at least about 20% greater (e.g., from about 20% to about 100% greater) than the conversion of initial feed to first polymer; and Element 19: the process wherein the second polymer has a polar comonomer content from about 20 wt. % to about 25 wt. % and a second polymer melt flow index of less than about 1.6 g/10 minutes (e.g., from about 0.1 g/10 minutes to about 1.6 g/10 minutes).

Examples of combinations include, but are not limited to, Element 1 in combination with one or more of Elements 2-19; Element 2 in combination with one or more of Elements 3-19; Element 3 in combination with one or more of Elements 4-19; Element 4 in combination with one or more of Elements 5-19; Element 5 in combination with one or more of Elements 6-19; Element 6 in combination with one or more of Elements 7-19; Element 7 in combination with one or more of Elements 8-19; Element 8 in combination with one or more of Elements 9-19; Element 9 in combination with one or more of Elements 10-19; Element 10 in combination with one or more of Elements 11-19; Element 11 in combination with one or more of Elements 12-19; Element 12 in combination with one or more of Elements 13-19; Element 13 in combination with one or more of Elements 14-19; Element 14 in combination with one or more of Elements 15-19; Element 15 in combination with one or more of Elements 16-19; Element 16 in combination with one or more of Elements 17-19; Element 17 in combination with one or both of Elements 18-19; Element 18 in combination with Element 19; Element 2 in combination with Element 3; Element 2 in combination with Element 3 and Element 6; and Element 2 in combination with Element 3 and Element 4.

Another nonlimiting example embodiment disclosed herein includes a polymer comprising polyethylene and a polar comonomer having a melt flow index that satisfies the following equation:

$$\text{melt flow index} \leq (0.0036 \pm 0.00002) e^{0.2407 \times [polar\ comonomer]}.$$

wherein the second polymer melt flow index has units of g/10 minutes and the polar comonomer content is in weight percent of the second polymer. Optionally, the embodiment may include one or more of the following Elements: Element 20: the polymer wherein the polar comonomer comprises comonomer comprises one or more of the following: methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, methyl crotonate, acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, maleic anhydride, allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide; Element 21: the polymer wherein the polar comonomer is vinyl acetate; Element 22: the polymer wherein one of the following conditions is satisfied: a polar comonomer content from about 30 wt. % to about 33 wt. % and a melt flow index from about 0.1 g/10 minutes to about 10 g/10 minutes; a polar comonomer content from about 28 wt. % to about 30 wt. % and a melt flow index from about 0.1 g/10 minutes to about 5 g/10 minutes; a polar comonomer content from about 25 wt. % to about 28 wt. % and a melt flow index from about 0.1 g/10 minutes to about 3 g/10 minutes; Element 23: the polymer wherein the concentration of a filler in the second polymer is about 0 wt. % (e.g., from about 0 wt. % to about 0.1 wt. %); Element 24: the polymer, being a component of an extrudate. Examples of combinations include, but are not limited to, Element 20 in combination with one or more of Elements 21-24.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

EXAMPLES

Example 1. Data suggesting that MFI will decrease with the addition of a PFR zone downstream of a first reaction zone is derived from previous work whereby an additional PFR zone was added to an existing PFR. The original PFR was comprised of three reaction zones and a fourth zone was added. Some examples of MFI decreases for two different PEVA products are summarized in Table 1 below.

Using a simple model for the effect of propylene on MFI, the predicted MFI of PEVA was added to the last column of the table. Similar effects are expected for the addition of the PFR downstream of a CSTR.

TABLE 1

| MFI (g/10 min) | VA (wt. % in PEVA) | Three Reaction Zones | | Four Reaction Zones | | Predicted MFI for Four Reaction Zones (g/10 min) |
|---|---|---|---|---|---|---|
| | | Production Rate, lb/h | Propylene Rate, lb/h | Production Rate, lb/h | Propylene Rate, lb/h | |
| 2.15 | 19.0 | 12,400 | 38 | 14,100 | 70 | 1.76 |
| 6.15 | 28.0 | 9,800 | 48 | 11,500 | 77 | 5.1 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

The invention claimed is:

1. A process comprising:
   contacting an initial feed comprising ethylene and a polar comonomer with a first polymerization initiator in a continuous stirred tank reactor to form an intermediate stream comprising a first polymer having a first polymer melt flow index; and
   contacting the intermediate stream with a second polymerization initiator in a plug flow reactor to form a product stream comprising a second polymer having a second polymer melt flow index that is lower than the first polymer melt flow index, wherein the polar comonomer comprises one or more of the following: a vinyl ester, a vinyl silane, a vinyl phosphine, a vinyl sulfide, an acrylic ester, an acrylic acid derivative, a nitrile, an acrylamide, maleic anhydride, N-vinylcarbazole, bis-(2-chloroethyl) vinylphosphonate, allyl alcohol, and N-vinyl-N-methylacetamide; and
   further wherein a relationship between the second polymer melt flow index (MFI) and a polar comonomer content of the second polymer satisfies the following equation:

Second Polymer MFI ≤ $(0.0036 \pm 0.00002)e^{0.2407 \times [polar\ comonomer]}$, wherein the second polymer melt flow index has units of g/10 minutes (determined per ASTM D1238, 190° C., 2.16 kg) and the polar comonomer-derived content is in terms of weight percent of the second polymer.

2. The process of claim 1, wherein the second polymer comprises from about 18 wt. % to about 45 wt. % of units derived from the polar comonomer.

3. The process of claim 1, wherein the polar comonomer comprises one or more of the following: vinyl acetate, vinyl butyrate, vinyl pivalate, vinylene carbonate, methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3-dionyl)phenyl acrylate, methyl methacrylate, n-butyl methacrylate, t-butyl methacrylate, cyclohexyl methacrylate, 2-ethylhexyl methacrylate, glycidyl methacrylate, beta-hydroxethyl methacrylate, beta-hydroxpropyl methacrylate, 3-hydroxy-4-carbomethoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, methyl crotonate, acrylic acid, methacrylic acid, crotonic acid, maleic acid, methyl hydroxy, maleate, itaconic acid, acrylonitrile, fumaronitrile, N,N-dimethyl acryl amide, N-isopropylacrylamide, N-t-butylacrylamide, N-phenylacrylamide, diacetone acrylamide, methacrylamide, N-phenylmethacrylamide, N-ethylmaleimide, maleic anhydride, allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide.

4. The process of claim 3, wherein the polar comonomer is vinyl acetate.

5. The process of claim 1, wherein weight average molecular weight ($M_w$) of the second polymer is greater than weight average molecular weight ($M_w$) of the first polymer.

6. The process of claim 1, wherein the second polymer MFI is from about 10% to about 100% lower than the first polymer MFI (determined per ASTM D1238, 190° C., 2.16 kg).

7. The process of claim 1, wherein the second polymer has a polar comonomer-derived content from about 25 wt. % to about 33 wt. %, on the basis of total mass of the second polymer, and the second polymer MFI is from about 0.1 g/10 minutes to about 10 g/10 minutes (determined per ASTM D1238, 190° C., 2.16 kg).

8. The process of claim 7, wherein the second polymer has a polar comonomer-derived content from about 25 wt. % to about 30 wt. %, on the basis of total mass of the second polymer, and the second polymer MFI is from about 0.1 g/10 minutes to about 5 g/10 minutes (determined per ASTM D1238, 190° C., 2.16 kg).

9. The process of claim 8, wherein the second polymer has a polar comonomer-derived content from about 25 wt. % to about 28 wt. %, on the basis of total mass of the second polymer, and the second polymer melt flow index from about 0.1 g/10 minutes to about 3 g/10 minutes (determined per ASTM D1238, 190° C., 2.16 kg).

10. The process of claim 1, wherein conversion of feed to second polymer is about 15% to about 50%, based on the amount of ethylene and polar comonomer in the initial feed.

11. The process of claim 1, wherein conversion of initial feed to second polymer is about 20% greater to about 100% greater than conversion of initial feed to first polymer.

12. The process of claim 1, further comprising extruding the second polymer.

13. A polymer obtained by the process of claim 1, said polymer comprising units derived from ethylene and units derived from a polar comonomer, said polymer having a melt flow index and a polar comonomer-derived content that satisfies one or more of the following:
  (a) polar comonomer-derived content from about 30 wt. % to about 33 wt. % and melt flow index from about 0.1 g/10 minutes to about 10 g/10 minutes (determined per ASTM D1238, 190° C., 2.16 kg);
  (b) polar comonomer-derived content from about 28 wt. % to about 30 wt. % and melt flow index from about 0.1 g/10 minutes to about 5 g/10 minutes (determined per ASTM D1238, 190° C., 2.16 kg);
  (c) polar comonomer-derived content from about 25 wt. % to about 28 wt. % and melt flow index from about 0.1 g/10 minutes to about 3 g/10 minutes (determined per ASTM D1238, 190° C., 2.16 kg).

14. The polymer of claim 13, wherein the polar comonomer is vinyl acetate.

* * * * *